W. C. CARNEY.
DEVICE FOR PLACING A VEHICLE ON A TRACK.
APPLICATION FILED APR. 24, 1912.
1,051,082.
Patented Jan. 21, 1913.
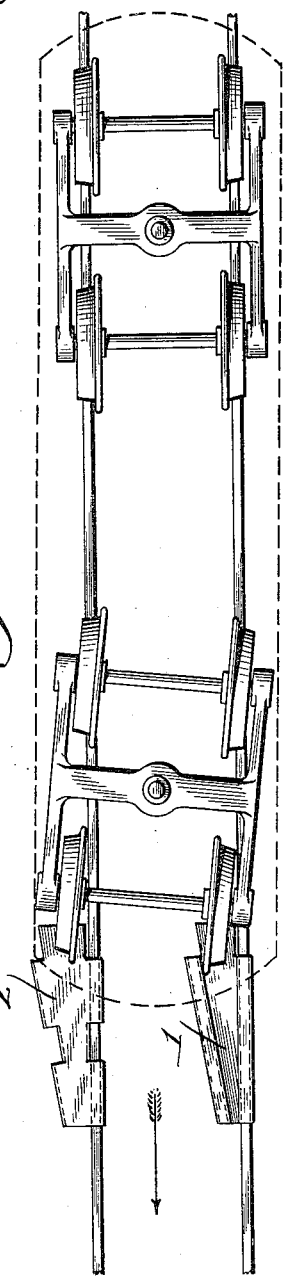
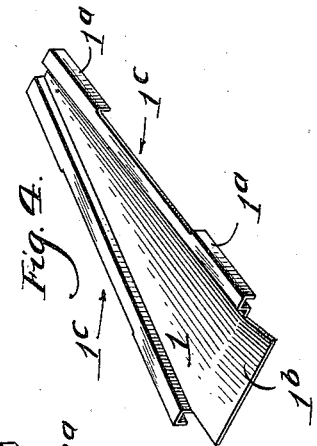
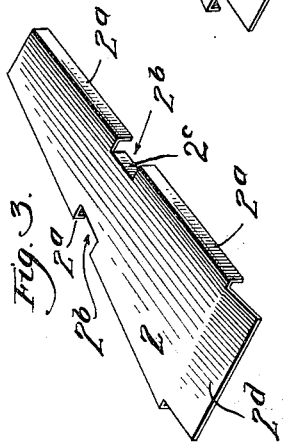
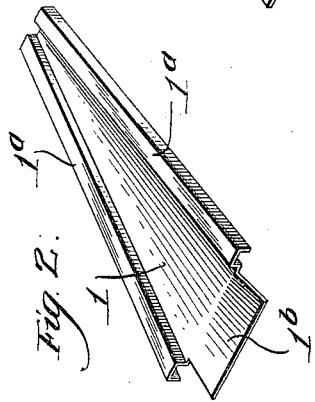
Witnesses:
Geo. J. Huting.
Elmer E. Rodabaugh.
Inventor:
William C. Carney.
By A. B. Bowman
his Atty

UNITED STATES PATENT OFFICE.

WILLIAM C. CARNEY, OF SAN DIEGO, CALIFORNIA.

DEVICE FOR PLACING A VEHICLE ON A TRACK.

1,051,082.   Specification of Letters Patent.   Patented Jan. 21, 1913.

Application filed April 24, 1912. Serial No. 692,953.

*To all whom it may concern:*

Be it known that I, WILLIAM C. CARNEY, a citizen of the United States, and a resident of San Diego, in the county of San Diego and State of California, have invented certain new and useful Improvements in Devices for Placing a Vehicle on a Track, of which the following is a specification.

My invention relates to devices adapted to facilitate the placing of a vehicle on a track and more particularly adapted to railway vehicles, and the like, and the objects of my invention are, first, to provide a simple, durable, and efficient means of facilitating the placing of a vehicle on a track, second, to provide such a means that may be conveniently carried on a vehicle to be used when desired, and third, to provide such a means that is adapted for straight or curved tracks.

With these and other objects in view as will appear, my invention consists of certain novel features of construction, as will be hereinafter described in detail and particularly set forth in the appended claims, reference being had to the accompanying drawings, and to the characters of reference thereon, which form a part of this specification, in which:—

Figure 1 is a plan view showing my device placed on a track, and a car in position ready to be replaced, Fig. 2 is a perspective view of one of the track engaging pieces, Fig. 3 is a perspective view of the other track engaging piece, and Fig. 4 is a perspective view of the first mentioned track engaging piece, shown in a slightly modified form from that in Fig. 2.

Similar characters of reference refer to similar parts throughout the several views.

The track engaging pieces 1 and 2 constitute the parts of my device.

The piece 1 is wedge shaped, as shown best in Fig. 2, and is provided on each side with a grooved flange $1^a$, which is adapted to fit over the top portion of the rail. The flanges extend above the upper surface of the main portion of the piece 1, to a height slightly less than the flange of the wheel of the vehicle. At the wide end of the piece 1 is provided an extended portion $1^b$, which is bent downwardly sufficiently to facilitate the rolling of the wheel onto the piece 1.

The upper surface of the piece 2 is plane, and is wedge shaped similarly to piece 1. It is provided on each side with a downwardly extending flange $2^a$. Near the middle of this piece there are provided two notches $2^b$, one on each side, and adjacent to each of these notches is provided a short flange $2^c$, parallel with the flanges $2^a$. This flange $2^c$ is placed a sufficient distance from the flange $2^a$, to accommodate the upper portion of the track between them. On the wide end of this piece 2 is also provided an extended portion $2^d$, which is bent downwardly to facilitate the rolling of the wheel onto the piece 2.

In the modified form shown in Fig. 4, the outside downwardly extended portion of the flange portion $1^a$ is cut away centrally at $1^c$. This portion is cut away to allow the use of the piece on a curve.

It will be readily seen that the piece 1 may be placed so that the groove in the portion $1^a$ will fit over the top portion of the rail with the wide end toward the vehicle to be replaced so that the wheel on that side will run on to the piece 1 between the two flanges; that the piece 2 may be placed on the opposite track so that the opposite wheel will ride upon the wide end thereof; that the flange on the side of piece 1 away from the track forms a guide for the wheel and forces it to its proper position on the track when the vehicle is moved toward the converging ends of the flanges and that the pieces are reversible and may be used on either side of the track.

Having thus described my invention, what I claim as new and desire to secure by Letters Patent is:—

1. In a device of the character described, a wedge-shaped piece provided with an inclined portion at the one end thereof, and with upwardly extending grooved flanged portions extending from said inclined portion the full length of said wedge shaped piece adapted to fit over a railway rail, the inner surface of said flanged portions converging toward one end of said wedge-shaped piece.

2. In a device of the character described, a wedge-shaped piece provided with an inclined portion at the one end thereof, and with upwardly extending grooved flanged portions extending from said inclined portion the full length of said wedge shaped piece adapted to fit over a railway rail, the inner surface of said flanged portions converging toward one end of said wedge-shaped piece, and another wedge-shaped piece to be used in connection therewith on the other railway rail, provided with downwardly extending flanges and with other flanges near the middle thereof and spaced apart from said other flanges on said piece a sufficient distance to fit over the upper portion of said other railway rail.

3. In a device of the character described, the combination of a wedge-shaped piece provided with an inclined portion at one end thereof, and with upwardly extending grooved flanged portions adapted to fit over a railway rail, the inner surface of said flanged portions converging toward one end of said wedge-shaped piece, and another piece to be used in connection therewith on the other railway rail, provided with an inclined portion at one end thereof and provided with downwardly extending flanges with other flanges near the middle thereof and spaced apart from said other flanges on said piece a sufficient distance to fit over the upper portion of said other railway rail.

4. In a device of the character described, the combination of a wedge-shaped piece provided with an inclined portion at its one end, and with upwardly extending grooved flanged portions extending from said inclined portion the full length of said wedge shaped piece adapted to fit over a railway rail, the inner surface of said flanged portion converging toward and to the one end of said wedge-shaped piece, and another wedge-shaped piece to be used in connection therewith on the other railway rail provided with an inclined portion at one end thereof, with downwardly extending flanges and with other flanges near the middle thereof and spaced apart from said other flanges on said piece a distance sufficient to accommodate the upper portion of said other railway rail.

5. In a device of the character described, a wedge-shaped piece provided with a downwardly inclined portion at the wide end thereof and with grooved flanges on each side thereof extending from said inclined portion the full length of said wedge shaped piece and converging toward and to the narrow end thereof, adapted to fit over a railway rail, leaving a narrow channel at said narrow end, and another wedge-shaped piece to be used in connection therewith on the other railway rail provided with a downwardly inclined portion at its wide end and with downwardly extending flanges on its sides, and with other short flanges near the middle thereof and spaced apart from said other flanges on said piece of sufficient width to fit over the upper portion of said other railway rails.

In testimony whereof, I have hereunto subscribed my name in the presence of two subscribing witnesses.

WILLIAM C. CARNEY.

Witnesses:
ABRAM B. BOWMAN,
GEORGE J. HUTING.

---

Copies of this patent may be obtained for five cents each, by addressing the "Commissioner of Patents, Washington, D. C."